United States Patent [19]

Bushnell

[11] Patent Number: 5,263,679
[45] Date of Patent: Nov. 23, 1993

[54] VALVE WITH ACTUATOR

[75] Inventor: Raymond B. Bushnell, Oregon City, Oreg.

[73] Assignee: Bushnell Engineering, Inc., Oregon City, Oreg.

[21] Appl. No.: 29,108

[22] Filed: Mar. 10, 1993

[51] Int. Cl.⁵ ......................................... F16K 31/122
[52] U.S. Cl. .................. 251/28; 137/630.14
[58] Field of Search ............ 251/28; 137/630, 630.13, 137/630.14, 630.15

[56] References Cited

U.S. PATENT DOCUMENTS

| | | | |
|---|---|---|---|
| 2,047,901 | 7/1936 | Crosby | 137/630.14 |
| 2,254,308 | 9/1941 | Nicholas | 137/630.14 |
| 2,688,340 | 9/1954 | Stehlin | 137/630.14 |
| 3,888,280 | 6/1975 | Tartaglia | 137/630.14 |
| 4,002,319 | 1/1977 | Pool et al. | 137/630.13 X |
| 4,615,354 | 10/1986 | Bianchi | 137/630.14 X |
| 4,669,700 | 6/1987 | Seidel | 251/28 |
| 5,174,335 | 12/1992 | Iwabuchi | 251/28 X |

Primary Examiner—Martin P. Schwadron
Assistant Examiner—Kevin L. Lee
Attorney, Agent, or Firm—James D. Givnan, Jr.

[57] ABSTRACT

A valve and actuator are disclosed with fluid flow through the valve controlled by a piston directly responsive to in line fluid pressure during both opening and closing movement. The actuator shifts a valve stem to open a poppet valve in the piston to admit in line pressure into a chamber to act on rearward surfaces of the piston to advance the piston into valve closing, seated contact with a valve seat. Initial closing movement of the piston is by the actuator with continued closing movement by in line fluid pressure. An additional valve on the stem controls communication of the chamber in which the piston is carried with an outlet to close the chamber for pressurization to effect forward seating of the piston. Valve opening movement of the actuator closes the piston mounted poppet valve and also vents the chamber to permit in line fluid pressure to shift the piston rearwardly to an open retracted position. A modified form of the valve and actuator includes a housing partially defining axially extending passageways communicating an inlet with an outlet and permitting installation of the valve and actuator in a system requiring an axial flow path.

16 Claims, 2 Drawing Sheets

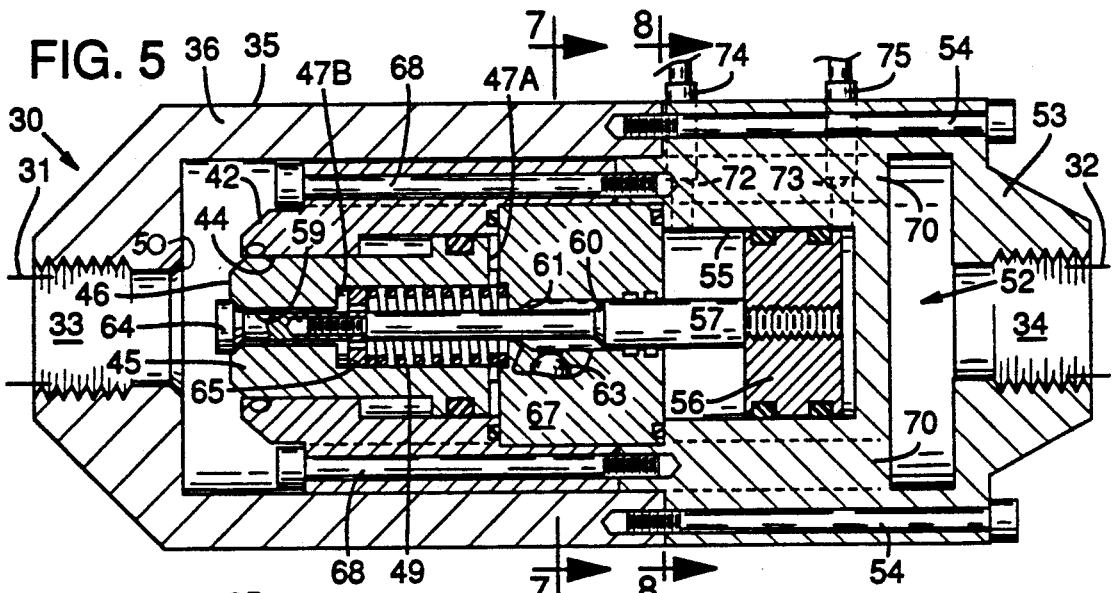
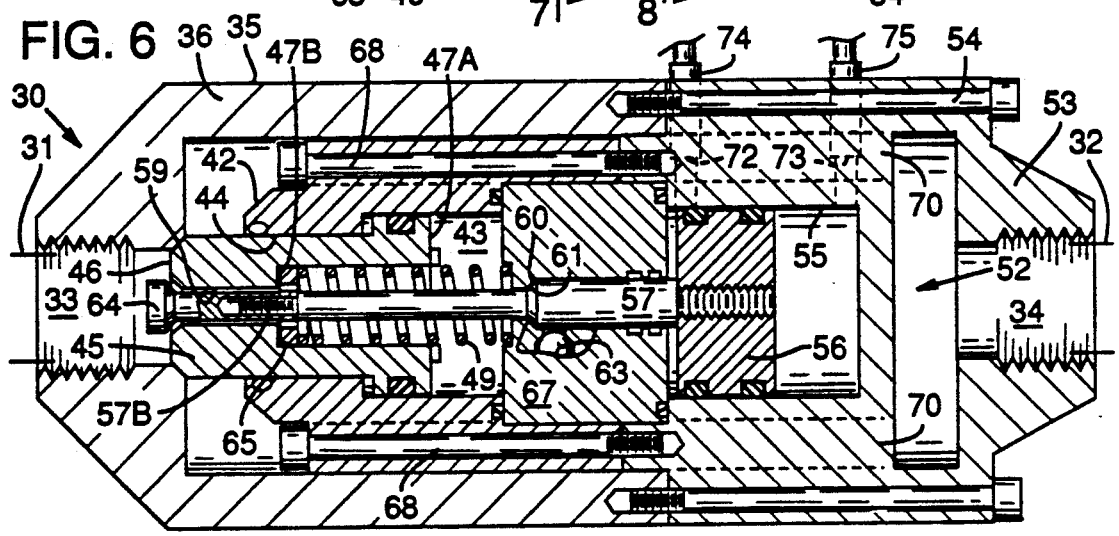
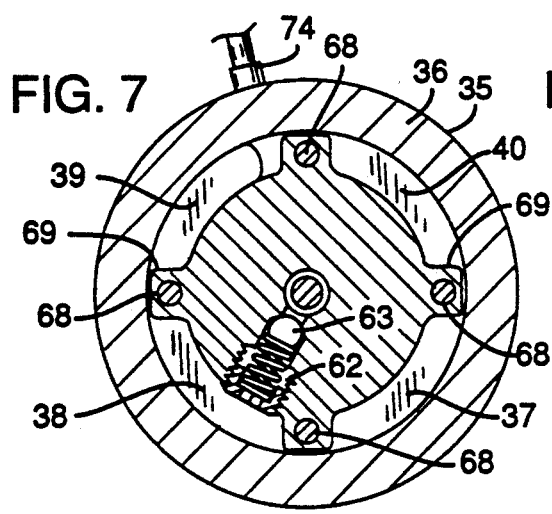
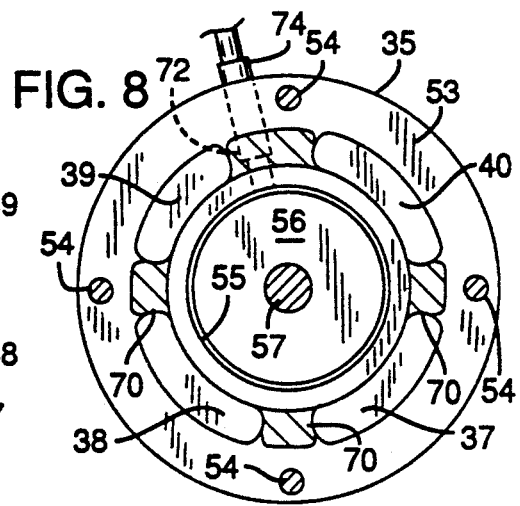

ced valve body 2 to fluid entry into chamber 3. A diffuser in said piston serves to inhibit somewhat the entry of fluid under line pressure into said chamber to cushion seating of the piston. Accordingly the present valve is opened and closed by means of an actuator which may be of a reduced size and power output as the actuator needs only a shift valve stem equipped with a poppet valve and initiate piston travel as opposed to conventional actuators which position a flow controlling ball, plug or spool all of which are side loaded by in line pressure requiring high cracking forces.

VALVE WITH ACTUATOR

BACKGROUND OF THE PRESENT INVENTION

The present invention pertains generally to valves which must be coupled with an actuator for effecting opening and closing of the valve.

In instances where valves are subjected to high line pressures over 1500 psi, a problem exists in providing an actuator capable of imparting sufficient force to open and close the valve while being compatible with the space available for the combined valve and actuator. Known valve actuators, whether of the pneumatic hydraulic or electrical type, by necessity of the power requirements, are such as to prohibit their use where space limitations are critical.

In the prior art are directional valves used in conjunction with a pilot valve which serves to direct fluid pressure to the ends of a spool in the directional valve. Such valve arrangements are not suitable for installations in areas where space is critical or where the valve must regulate flows through lines above ⅝ inch diameter or so. Further, the directional valve spool is typically shifted by a separate hydraulic circuit passing through the pilot valve.

SUMMARY OF THE PRESENT INVENTION

The present invention is embodied within a valve and valve actuator combined therewith in a manner to permit line pressure for the most part to actuate the valve.

The present valve includes a piston through which line fluid passes into a chamber for pressurizing the rearward end of the piston which, being of greater surface area than the piston forward end, results in seating of the piston forwardly to close the valve. The valve actuator is utilized initially to open a poppet valve in the piston allowing line pressure passage through the piston and into the chamber. Pressurizing of the chamber occurs simultaneously with the closing of a second valve on the valve stem. Conversely, the present valve is opened by shifting of the valve stem to close the piston mounted poppet valve and to simultaneously open a vent for the discharge or venting of fluid pressure from the back side of the piston. Line pressure thereafter serves to shift the piston to an open position. A diffuser in said piston serves to inhibit somewhat the entry of fluid under line pressure into said chamber to cushion seating of the piston. Accordingly the present valve is opened and closed by means of an actuator which may be of a reduced size and power output as the actuator needs only a shift valve stem equipped with a poppet valve and initiate piston travel as opposed to conventional actuators which position a flow controlling ball, plug or spool all of which are side loaded by in line pressure requiring high cracking forces.

Important objectives of the present invention include the provision of a valve and actuator wherein line pressure is utilized to at least partially shift a piston for opening and closing of the valve; the provision of a valve and actuator which may utilize a variety of linear actuators such as air cylinders, solenoids, or motors all of which have only modest power requirements and may be of compact design; the provision of a combined valve and actuator compatible with right angle or in line flow paths; the provision of a combined valve and actuator of highly compact design to enable their utilization in installations where space is critical; the provision of a combined valve and actuator suitable for use in extremely high line pressure environments and wherein high line pressure utilization permits rapid opening and closing of the valve; the provision of a valve with few parts which move in linear fashion for less wear and longer valve life; the provision of a valve which is directed toward use in zero leak-zero emission environments.

BRIEF DESCRIPTION OF THE DRAWINGS

In the accompanying drawings:

FIG. 5 is a view similar to FIG. 1 but showing a modified form of the present valve;

FIG. 6 is a view similar to FIG. 5 showing the modified valve in a closed position;

FIG. 7 is a vertical sectional view taken along line 7—7 of FIG. 5; and

FIG. 8 is a vertical sectional view taken along line 8—8 of FIG. 5.

DETAILED DESCRIPTION OF THE PREFERRED EMBODIMENTS

Figure 1:
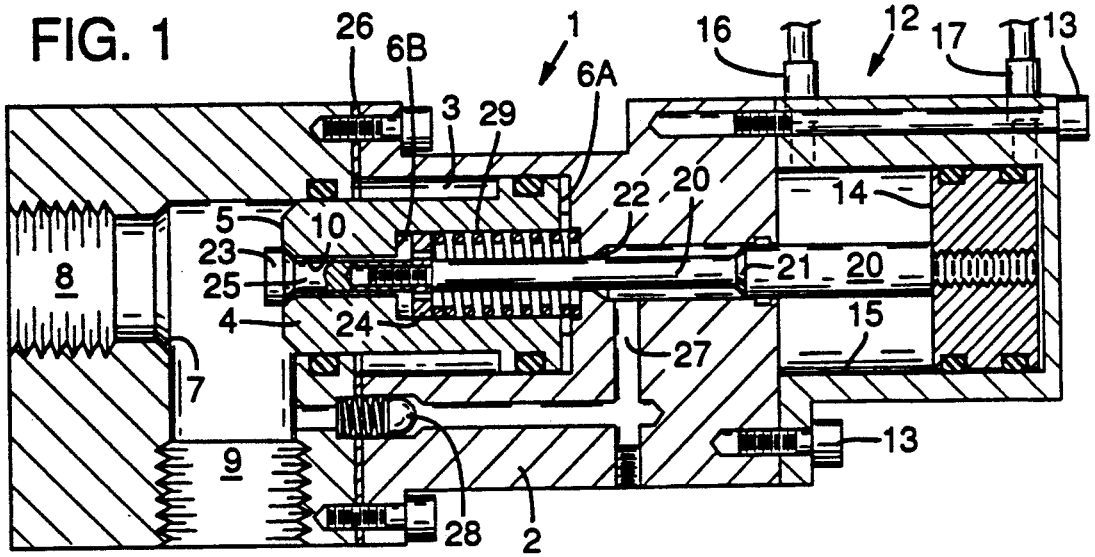
FIG. 1 is a vertical sectional view of a valve embodying the present invention.
Figure 2:
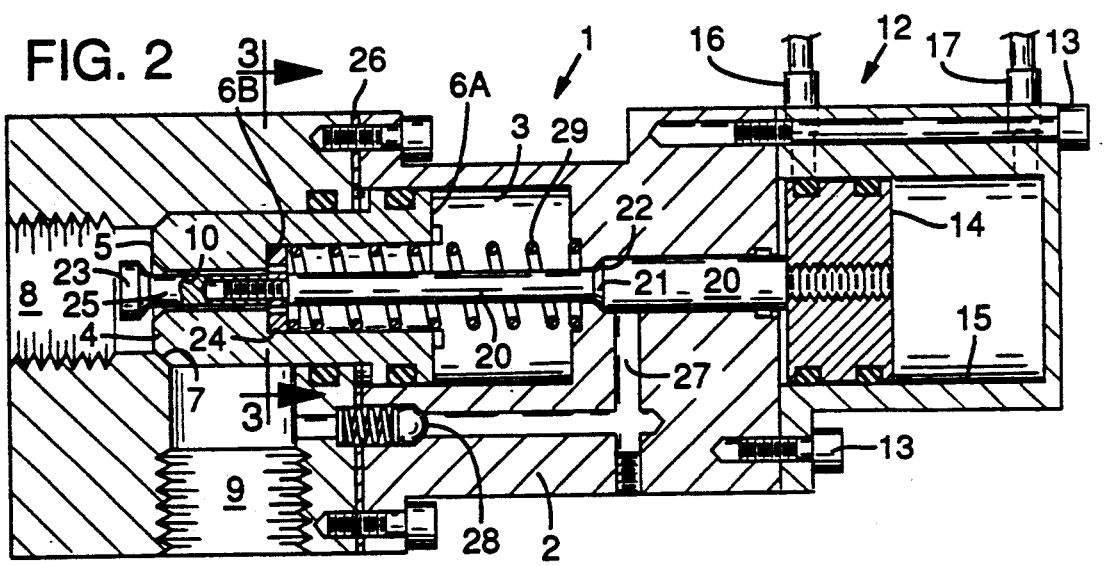
FIG. 2 is a view similar to FIG. 1 and showing the valve in a closed position.

With continuing attention to the drawings wherein parts are identified with reference numerals hereinafter used to identify like parts, the reference numeral 1 indicates generally a valve embodying the present invention and having an angular flow path therethrough.

A valve body 2 defines a chamber 3 within which is received a piston 4. A piston frontal surface 5 is of somewhat lesser surface area than a composite rearward surface 6A and 6B of the piston.

In valve body 2 is a first valve seat 7 which receives the forward, beveled edge of piston 4 to close the present valve by interrupting communication between a valve inlet 8 and an outlet 9.

An actuator generally at 12 is affixed to valve body 2 as by machine screws 13 and may be embodied in a piston 14 within a cylinder 15. Fluid lines at 16 and 17, in communication with a directional control valve (not shown) pressurize and discharge fluid from cylinder 15 during operation of the present valve.

Figure 3:
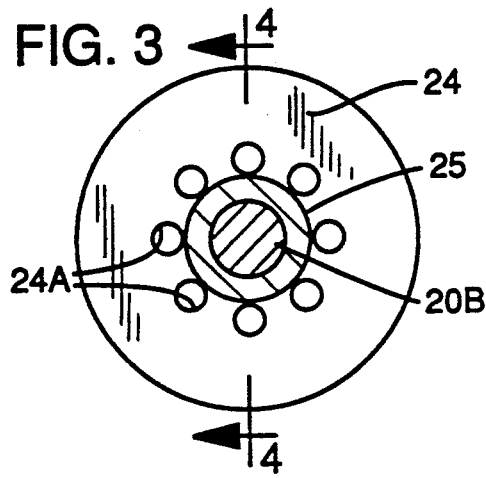
FIG. 3 is a vertical sectional view taken along line 3—3 of FIG. 1.
Figure 4:
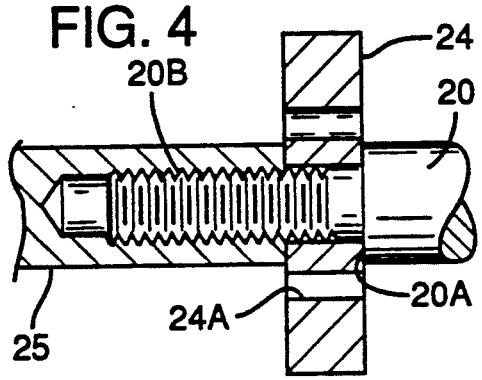
FIG. 4 is a side elevational view taken from the right side of FIG. 3.

A valve stem 20 is actuated by piston 14 and includes valve means with a beveled surface 21 for seated engagement with a second valve seat 22 on valve body 2. At the forward end of stem 20 is mounted, as by a threaded segment 20B of the stem, a poppet valve 23. The poppet valve seats in the frontal surface 5 of flow controlling piston which surface is apertured to seat the poppet valve in a fluid tight manner. Also in place on stem 20 is a disk shaped diffuser 24, as best viewed in FIGS. 3 and 4, which is confined in place on the stem by a shoulder 20A and oppositely by a shank 25 of poppet valve 23. The shank is shown internally threaded to receive threaded end segment 20B of the stem 20. Diffuser 24 has a series of apertures 24A which inhibit fluid flow into chamber 3.

A vent or passageway at 27 serves to receive pressurized fluid from chamber 3 and to direct same to valve outlet 9 via a check valve 28. A fluid flow through vent passageway 27 is permitted upon unseating of valve means 21 from valve seat 22 during valve opening as later more fully explained. A bore 10 in piston 4 serves as a fluid passageway as well as to receive poppet 23. A vent 26 provides an indicator of any seepage past piston 4. A spiral spring 29 urges stem 20 forwardly.

With attention now to FIGS. 5 through 8, a modified valve is indicated generally by the reference numeral 30 and is suitable for installation in axially aligned inlet and outlet lines 33 and 34 each suitably secured within ports 33 and 34. A valve body 35 includes a housing 36 through which fluid may pass from inlet port 33 to outlet port 34 via passageways 37, 38, 39 and 40. Valve body 35 additionally includes a head 42 which partially defines a chamber 43. A bore 44 in head 42 slidably carries a piston 45 by having a frontal surface 46 and a composite rearward surface 47A and 47B of greater total area than frontal surface 46.

Valve body 36 has a first valve seat 50 against which a beveled outer edge of piston 45 seats to close the valve assembly. An actuator generally at 52 includes an end cap 53 which constitutes a part of valve body 35. Cap screws 54 secure the end cap to a remaining portion of valve body 35. A cylinder 55, preferably pneumatic, is formed within end cap 53 and receives a piston 56 suitably equipped with seals. The piston is coupled to a stem 57 which includes valve means including a beveled surface 60 which seats against a second valve seat 61 when the stem is forward to close off chamber 43 from a vent passageway 62. In continuing similarity to the first described embodiment of the present valve assembly, the forward end of stem 57 is provided with a threaded segment 57B which receives a poppet valve 64. Poppet valve 64 is carried in a bore 59 and seats in the frontal surface 46 of piston 45 which is apertured to seat the poppet valve in a fluid tight manner. Also in place on stem 57 is a diffuser 65 of the type earlier described as a part of the first described valve. Diffuser 65 is of disk shape and is affixed to stem 57 in a manner ensuring axial movement of the diffuser with the stem. A spiral spring 49 urges piston 45 forwardly toward a closed position. Head 42 of the valve body is secured to cap 53 and an intermediate valve body member 67 by cap screws 68 which are circumferentially spaced about head 42 with each passing through head defined bores and through aligned bores in intermediate valve body members 67. Threaded sockets are provided in webs 70 located at intervals about cylinder 55 to receive the threaded end segments of the cap screws 68. Accordingly head 42 and intermediate valve body member 67 are secured in place to end cap 53 with an axial flow of fluid between inlet and outlet ports 33 and 34 being permitted by passageways 37–40. A vent ball check valve is at 63.

Delivery of fluid to and exhausting of fluid from cylinder 55 is by passageways 72 and 73 each counterbored and tapped to receive fittings at 74 and 75 with each served by a fluid conduit.

The following description of valve operation is pertinent to both forms of the present valve assembly shown with the sequence of valve operation being the same but with flow patterns being angular and axial in the first and second described embodiments. With attention to FIG. 1, the admission of a pressurized fluid to the blind end of cylinder 15 via conduit 17 serves to displace piston 14 forwardly to initially displace poppet 23 and diffuser 24 in the same direction. Advancing diffuser 24 moves it into abutment with rearward surface 6B of piston 4 to forwardly displace the piston toward seat 7.

Fluid under line pressure will pass rearwardly about unseated poppet valve 23 which fluid is inhibited somewhat in its passage into chamber 3 by passage through orifices 24A of the diffuser. Continuing advancement of piston 4 toward seat 7 is by actuator 14 until such time as valve means 21 abuts valve seat 22 to block passage of fluid from chamber 3. Accordingly, upon closure of valve means 21, chamber 3 will be pressurized by line pressure entering via open poppet valve 23 which fluid pressure will act on composite rearward piston surfaces 6A and 6B to impart terminal travel to piston 4 to seat its frontal surface 5 (of lesser surface area) against seat 7. The valve is now closed and will remain closed until subsequent actuation of actuator 14. Opening of the valve assembly by rearward movement of piston 4 is achieved by the admission of pressure via conduit 16 into actuator cylinder 15 initiating rearward movement of piston 14 which results in poppet valve 23 seating in front wall surface 5 of the piston. Simultaneously valve means 21 unseats from seat 22 to vent chamber 3 via vent passageway 27. Line pressure will act on frontal surface 5 of the piston with fluid pressure in chamber 3 unloading through passageway 27, check valve 28 and into outlet 9. Line pressure acting on piston frontal surface 5 causes rearward displacement of the piston and opening of the valve assembly.

One satisfactory embodiment of the present valve assembly utilizes rearward piston surfaces 6A–6B, 47A–47B of 46 percent greater surface than their corresponding frontal surfaces at 5 and 46.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A valve with actuator comprising,
   a valve body having an inlet and an outlet, a first valve seat on said valve body proximate said inlet,
   a piston engageable with said valve seat and movable within a chamber in said valve body, said piston having a frontal surface in communication with said inlet and a rearward surface partially defining said chamber and of greater surface area than said frontal surface,
   a vent passageway in said valve body in controlled communication with said chamber and with said outlet,
   a valve stem having a poppet valve located in said frontal surface of the piston, valve means located along said stem for cooperation with a second valve seat in said valve body to control fluid flow from said chamber through said vent, and
   an actuator coupled to said valve stem to shift the stem in one direction to unseat said poppet valve and to close said valve means to admit fluid pressure from said inlet into said chamber to pressurize same and bias the rearward surface of said piston to shift same forwardly to engage said first valve seat to close said inlet, said actuator operable in an opposite direction to retract said stem to close said poppet valve and to open said valve means for venting of pressure in said chamber to allow fluid pressure in said inlet to shift said piston rearwardly to communicate the inlet and outlet.

2. The invention claimed in claim 1 wherein said valve body includes a housing defining said inlet and outlet, said inlet and said outlet located proximate opposite ends of said housing.

3. The invention claimed in claim 1 wherein said actuator is of a pressure responsive type.

4. A valve assembly including,
- a valve body having an inlet subject to line pressure and an outlet and defining a chamber,
- a flow control member responsive to fluid pressure in said chamber and said inlet for rectilinear movement in said valve body, a fluid passageway in said flow control member for the admission of fluid from said inlet to said chamber,
- an actuator,
- a stem axially positioned by said actuator and including a valve controlling fluid flow from said inlet through said passageway into said chamber, valve means on said stem blocking fluid discharge from said chamber when the stem is in a forward position, means on said stem imparting initial closing movement to said flow control member, said initial closing movement of said stem operable to unseat said valve for the admission of fluid pressure through said passageway into said chamber and to close said valve means to block fluid discharge from said chamber, and
- said flow control member having frontal and rear surface areas of different size with the rear surface area greater than the frontal surface area whereby fluid pressure in said chamber contributes to terminal closing movement of said flow control member, line pressure in said inlet acting on the frontal surface of the flow control member to impart rearward opening movement to said member to open the valve assembly.

5. The valve assembly claimed in claim 4 wherein said valve is a poppet valve, said frontal surface of said flow control member having a seat for said poppet valve.

6. The valve assembly claimed in claim 4 wherein said valve body includes a housing, said inlet and said outlet oppositely disposed on said housing.

7. The valve assembly claimed in claim 6 wherein said inlet and outlet are in axial alignment.

8. The valve assembly claimed in claim 4 wherein said valve body defines a passageway in communication with said outlet for directing fluid from said chamber to said outlet.

9. The valve assembly claimed in claim 4 additionally including spring means biasing said stem and said poppet valve the latter to an open position.

10. The valve assembly claimed in claim 4 wherein said stem includes a diffuser inhibiting the flow of fluid into said chamber.

11. The valve assembly claimed in claim 6 wherein said housing includes an end cap, said actuator including a cylinder and piston located in said end cap, said end cap provided with passages serving said cylinder, axially extending passageways in said valve body for communication with said inlet and said outlet.

12. In a valve,
- a valve body having an inlet and an outlet and a valve seat proximate said inlet, a chamber in said valve body,
- a piston for abutment with said seat to close the valve and having a frontal surface subject to fluid pressure in said inlet, said piston having a rearward surface of greater surface area than said frontal surface and subject to fluid pressure in said chamber,
- an actuator,
- a valve stem positioned by said actuator and extending through said piston, first valve means on said stem and when open permitting the entry of fluid from said inlet into said chamber, second valve means on said stem to simultaneously block the discharge of fluid from said chamber whereby the chamber is pressurized and the piston advanced into engagement with said seat to close the valve, and
- said actuator operable to position said stem to close said first valve means and to open said second valve means permitting fluid pressure in said inlet to unseat said piston and enable fluid flow from said inlet to said outlet.

13. The invention claimed in claim 12 wherein said valve stem is spring biased forwardly, said first valve means is spring biased toward an unseated position relative said piston.

14. The invention claimed in claim 12 wherein said second valve means blocks the discharge of fluid from said chamber immediately prior to abutment of the piston with the valve seat whereby fluid pressure in said chamber subsequently effects seating of the piston with the valve seat.

15. The invention claimed in claim 12 wherein said first valve is a poppet valve slidably housed in said piston.

16. The invention claimed in claim 12 wherein said valve body includes a housing with axially directed passageways through which fluid passes when said piston is unseated.

* * * * *